March 20, 1956 — L. F. PERKINS — 2,738,674
OIL GAUGE
Filed July 9, 1954
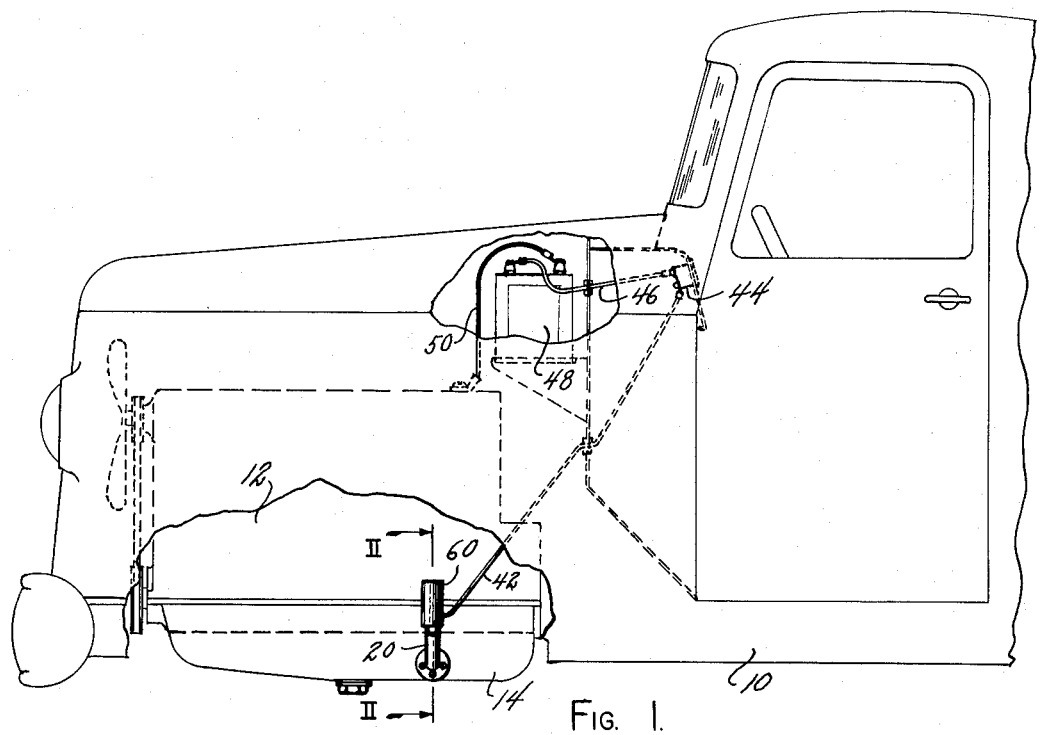
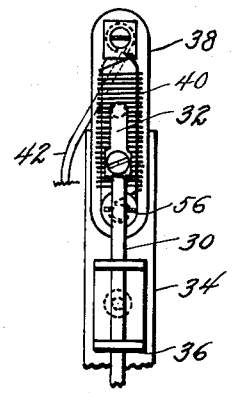
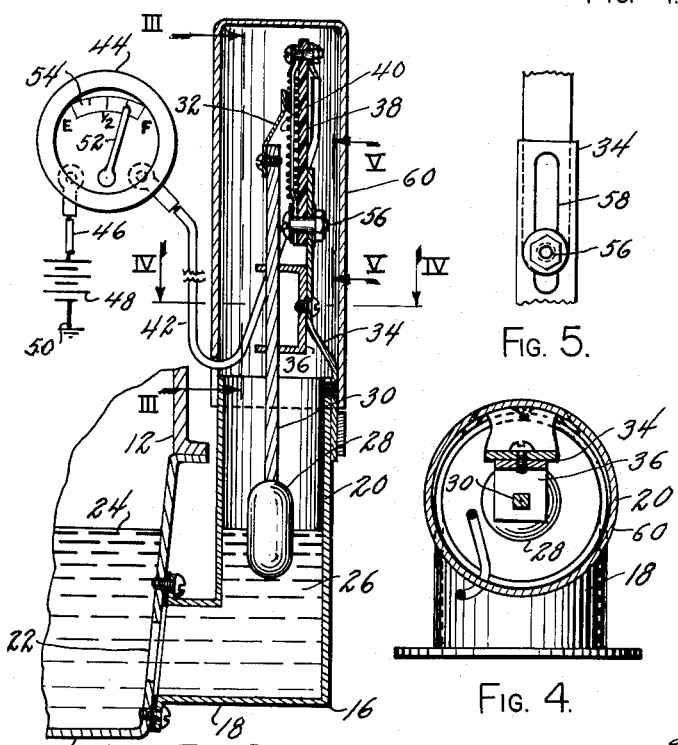
Luther F. Perkins
INVENTOR.
BY Wm. Q. Ballard
ATTORNEY.

United States Patent Office 2,738,674
Patented Mar. 20, 1956

2,738,674

OIL GAUGE

Luther F. Perkins, Sandusky, Ohio

Application July 9, 1954, Serial No. 442,261

1 Claim. (Cl. 73—313)

This invention relates to gauges.

An object of this invention is to provide a gauge which will register the volume or level of oil in the oil pan of an internal combustion engine, compressors or the like.

Another object of this invention is to provide a unitary construction readily attached to the oil pan of an internal combustion engine with a minimum of connections, and to provide a circuit for operating a visible gauge on the dashboard of a motor vehicle.

Another object of this invention is to provide a simple construction readily adjustable to accommodate and correct any variations from true gauge readings.

And another object of this invention is to provide an oil gauge for an internal combustion engine which will steadily indicate the volume of oil in an oil pan regardless of disturbances within the pan.

Other objects and advantages of this invention relating to the arrangement, operation and functions of the related elements of the structure, to various details of construction, to combination of parts and to economies of manufacture, will be apparent to those skilled in the art upon consideration of the following description and appended claim, reference being had to the accompanying drawings forming a part of this specification wherein like reference characters designate corresponding parts in the several views.

Referring to the drawings:

Fig. 1 is a partial side elevation of a motor vehicle having an internal combustion engine equipped with a gauge embodying the invention herein;

Fig. 2 is a view on the line II—II, Fig. 1;

Fig. 3 is a view on the line III—III, Fig. 2;

Fig. 4 is a view on the line IV—IV, Fig. 2; and

Fig. 5 is a view on the line V—V, Fig. 2.

The invention herein may readily be adapted to any internal combustion engine including an oil pan, but is herein shown installed in a motor vehicle.

Motor vehicle 10 is powered by an internal combustion engine 12, including an oil pan 14. This pan, as is usual, contains a sufficient volume of oil to insure efficient operation of the engine 12.

The device herein comprises a tubular L-shaped element 16 having a minor horizontal extension 18 in communication with a vertical major chamber forming portion 20. An aperture 22 is provided in the oil pan 14 and the minor portion 18 is attached to the pan, so that the interior of the pan 14 is in communication with the leg 18 through the aperture 22. Oil 24 will naturally flow through aperture 22 into the minor tubular extension 18 and thence into the chamber 20, so that the surface of the oil in the chamber 20 is at all times co-planar with the surface of the oil 24 within the pan 14. There is thus provided a body of oil 26 within the chamber 20, and this volume is unaffected by any disturbances created in the body 24 due to engine operation or otherwise.

Float 28 in the chamber 20 will rise and fall as the volume of oil 26 increases or decreases. This float 28 carries stem 30 in turn carrying spring finger 32 on the end remote from the float. The upstanding leg 20 carries an extension plate 34, in turn carrying a U-shaped bracket 36 providing a guide and support for the stem 30. The plate 34 additionally carries, at its upper end, insulation plate 38 having an electrical resistance 40 attached to the face thereof. This resistance 40 is contacted by the spring finger or contact element 32, which slides thereover in response to the rise and fall of the float 28. The resistance at one end is grounded and its opposite end line 42 extends therefrom to one terminal of an electric gauge 44. The opposite terminal of the gauge is connected by line 46 to a source of electric energy 48, which is normally the battery of the vehicle 10. The opposite terminus of the battery is connected to ground 50, and as the device itself is grounded, it is obvious an increase or decrease of the resistance connection between the contact 32 and the resistance 40 will vary the current flow to the gauge 44, which in turn causes its indicator to travel over a scale 54, thereby giving a responsive reading on the gauge to the height of the float within the chamber 20, and of course equivalent to the height of the oil 24 within the pan 14.

The insulation plate 38 is attached to the arm 34 by means of a bolt-like connection 56 extending through a slot 58 within the arm 34. This allows the resistance to be adjusted for the zero or original setting of the gauge or any later correction in its reading. The resistance portion of the circuit is housed within a cap 60 fitted over the upper terminus of the chamber 20, thereby forming a closed chamber, preventing dirt or other accumulations from affecting the resistance contact connection or getting into the body of the oil.

This unitary construction is readily installed upon the oil pan of an internal combustion engine by merely tapping the wall of the oil pan and attaching the minor tubular portion of the unit thereto. There is thus provided an accessory which may be readily attached to any oil container, and which will give a steady reading on the gauge connected thereto, regardless of any disturbances affecting the body of the oil 24. In other words, the float carrying oil is substantially isolated from the body of oil being measured, yet the communication therebetween through the aperture 22 maintains the oil body 26 in constant relationship to the body of oil 24.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claim beyond the requirements of the prior art.

What is claimed and desired to secure by United States Letters Patent:

An oil gauge for indicating the level of oil in an oil pan of an internal combustion engine, said oil pan including a bottom with sides upwardly extending therefrom and provided with an opening through one of said sides of a size to allow free flow of oil therethrough, an L-shaped tube of substantially constant diameter throughout its length greater than the diameter of said opening and including a minor horizontally disposed portion in communication with said opening and a major vertical portion as a continuation thereof whereby oil from the pan will maintain a body of oil in said major tube portion with a surface co-planar with the surface of oil in said pan, a frame upwardly extending from said major tube portion having a resistance thereon, a contact slidable along said resistance, a float on the oil in said major tube portion having an extension mounting said contact and controlling its position relatively to the resistance and the surface of the oil in said tube, an electric circuit including a gauge remote from and including said resistance to operate said gauge in response to the position of said contact relatively to the resistance, means for adjusting said frame and in consequence the resistance relatively to the surface of the oil in said tube, and a cup-shaped cover for said tube providing an extension thereof to house said resistance.

References Cited in the file of this patent

UNITED STATES PATENTS

| | | |
|---|---|---|
| 1,259,538 | Luce | Mar. 19, 1918 |
| 1,605,116 | Kellum | Nov. 2, 1926 |
| 2,623,143 | Laury | Dec. 23, 1952 |